April 28, 1959  C. A. VOSSBERG  2,883,895
ROLLING MILL THICKNESS CONTROL SYSTEM
Filed Oct. 15, 1954  2 Sheets-Sheet 1

INVENTOR.
Carl A. Vossberg
BY
ATTORNEY

United States Patent Office 2,883,895
Patented Apr. 28, 1959

2,883,895

ROLLING MILL THICKNESS CONTROL SYSTEM

Carl A. Vossberg, Umatilla, Fla.

Application October 15, 1954, Serial No. 462,461

6 Claims. (Cl. 80—56)

The present invention relates to automatic thickness control systems and methods of operation for rolling mills to insure a uniform gauge for the rolled web or strip of metal or other material at the output of the mill.

Thickness control methods and apparatus of the general type with which the present invention is concerned are known in the art. These conventional control systems continuously measure the output thickness of the moving web or strip and cause the rolling pressure and sometimes the web tension to be varied as and when required to maintain a constant thickness within predetermined limits at the output of the mill. The error in thickness is not corrected until after it has occurred and has been detected.

With systems of this type, a certain amount of off-gauge material is out of the mill and the processing is completed before it can be measured and the off-gauge condition ascertained. Thus only a trend can be noted and, at best, attempts can be made to correct the oncoming sections by assuming that the trend will persist. Actually, should the variations be erratic, or the trend reverse, the actual corrections may indeed be incorrect.

The control system of the present invention differs from these usual control systems in the provision of anticipatory measuring or gauging apparatus located ahead of the processing or rolling apparatus and which detects a deviation in thickness in the moving web before it reaches the rolls. A correction signal is transmitted to the pressure varying screwdown controls and to the web tension controls or other thickness control means acting on the strip in timed relationship with respect to the web speed so that the roll pressure or the web tension or both are varied to compensate for the thickness variation in the input material just as the incoming portion of different thickness enters the nip of the rolls and before it leaves the mill. In this manner, the output thickness will remain substantially constant and no off-gauge waste material will be rolled, notwithstanding abrupt variations or an erratic trend in the thickness of the input material.

The invention is advantageously applied to rolling mills comprising a plurality of stands by deriving the anticipatory correction signal from the moving strip at a location early in the mill, which may be, for example, a location between the first and second stands, an output deviation signal being derived after the finished strip has passed through the final stand. Steady state control of the mill is exercised at a highly retarded rate by the output deviation signal, the anticipatory signal being used to take care of abrupt changes in thickness before the moving strip has left the mill.

It will be understood, that slow or gradual changes in the characteristics of the input material may be satisfactorily (for all practical purposes) corrected by conventional follow-up controls which respond slowly or gradually to a measurement made after the material has been processed. On the other hand, such conventional controls are incapable of correcting for abrupt or transient changes in input conditions because no corrective action is taken until after a certain amount of non-usable material outside of the permissible tolerance has been produced by the processing apparatus as above explained.

With the foregoing in mind, the invention generally comprises an anticipatory transient responsive measuring device for the input material located ahead or upstream of the rolling or other continuous processing apparatus. A synchronized delay or memory storage device is interposed between the transient responsive anticipatory measuring device and the corrective control for the rolling or other processing apparatus. The extent of the delay is directly controlled in accordance with the flow velocity of the input material to provide a timed relationship such that the required sudden corrective action is taken just as the incoming material with the detected change in its thickness or other characteristic arrives at the point of processing. In addition to this anticipatory corrective action there is provided a gradual and slow-acting follow-up control action which corrects in the usual manner for slow or gradual changes measured at the output of the processing apparatus. Thus, the follow-up control at the mill output slowly corrects for gradual changes and the rapidly responsive anticipatory control responds primarily to input variations of an abrupt or transient nature and causes corrective response to such abrupt changes in input conditions, to be made at the proper time.

Various objects, features and advantages of the invention will become apparent upon reading the following specification together with the accompanying drawing forming a part hereof.

Referring to the drawing.

Figure 1:
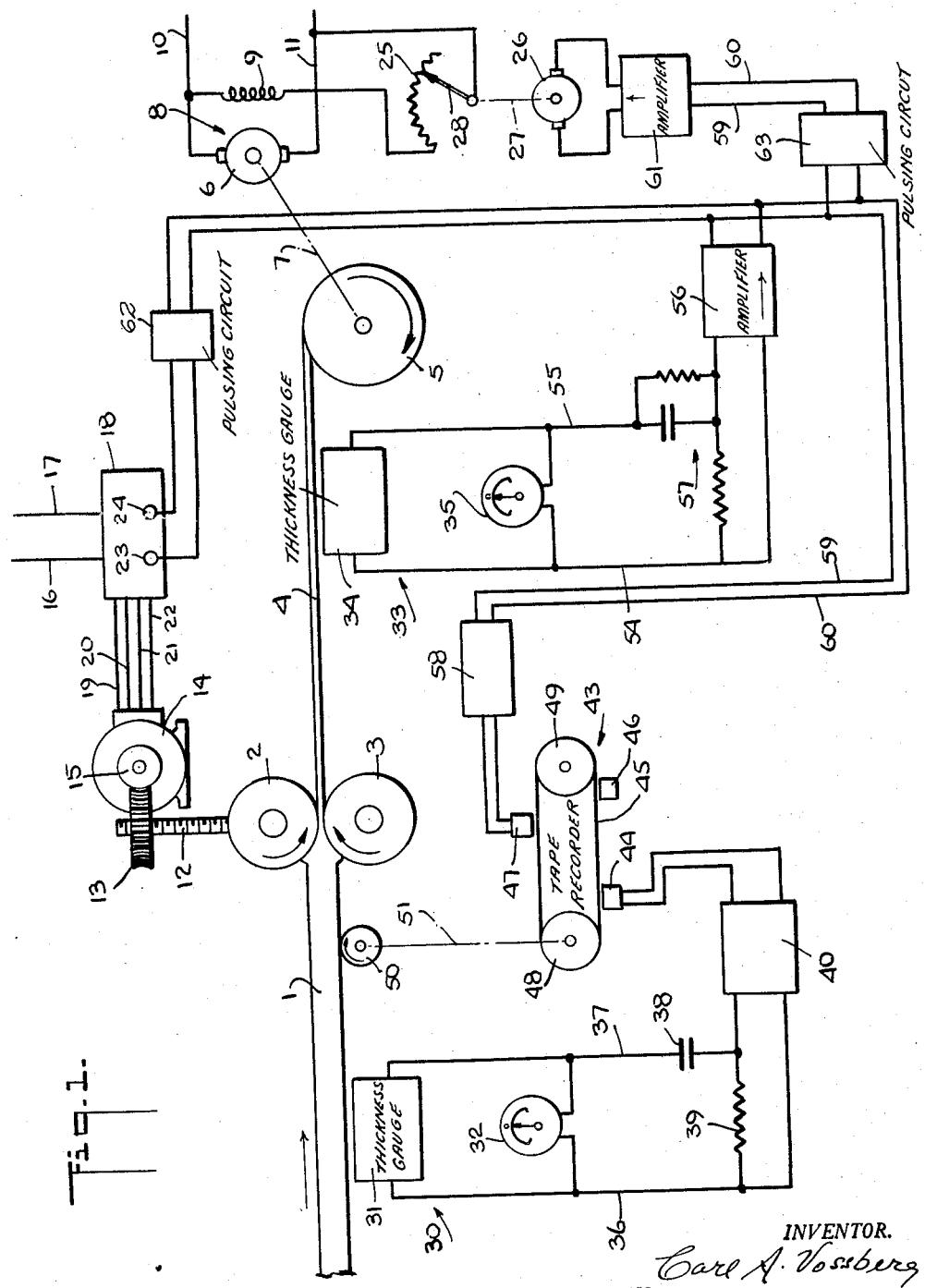
Figure 1 is a diagrammatic illustration of an embodiment of the invention.

Referring to Fig. 1 of the drawing, a web of material 1 which, for purposes of illustration is assumed to be a strip of metal, is continuously fed to a pair of superposed rolls 2, 3 to effect a reduction in thickness in the web 1. The rolls 2, 3 are driven at a constant adjustable speed by conventional driving means which have been omitted from the drawing for simplicity of illustration. After passing between the rolls 2, 3 the emerging portion 4 of reduced thickness leaves the mill at a speed higher than the speed of the thicker input portion 1, the entire strip 1, 4 moving toward the right in the direction of the arrow where it is wound upon a tension or pulling drum 5. The pulling drum 5 is driven by a motor armature 6 through a mechanical connection indicated by a dotted line 7. The armature 6 forms a part of a direct current motor 8 comprising a field winding 9 and supplied with power by power line conductors 10 and 11. The usual starting and auxiliary motor control apparatus have been omitted from the drawing.

The rolls 2 and 3 are mounted in the usual manner in a stand (not shown) which comprises at least one non-rotatable vertically movable exteriorly threaded screw 12 connected to the upper roll 2 for varying the rolling pressure applied to the incoming web 1 as it passes through the nip of the superposed rolls 2 and 3. The pressure is controlled by a vertically fixed interiorly threaded worm wheel 13 which is in threaded engagement with the screw 12 to move the screw 12 vertically in response to rotation of the worm wheel 13. The worm wheel 13 is arranged to be selectively driven in either direction by means of a reversible electric motor 14 which has a worm 15 fixed to its output shaft, the worm 15 being in mesh with the worm wheel 13.

The reversible motor 14 is connected to a suitable power supply comprising two conductors 16 and 17 through a reversing motor control 18 and a further group of four conductors 19–22, such a control system being conventional.

The power supply may be of any desired type. Usually, it is a direct current supply. In this case, conductors 19 and 20 may be armature conductors and conductors 21 and 22 may be field conductors for the motor 14, the motor control 18 comprising suitable contactors or other circuit control means for reversing the relative polarities between the armature and field conductors in accordance with the desired direction of rotation for the motor 14.

As will be understood by those skilled in the art, the motor control 18 may comprise interlocked contactors for controlling the motor operation and determining its direction of rotation. If alternating current is available as an input supply, a magnetic amplifier system may be used to determine not only the direction of rotation of the motor, but also its speed. Conveniently, this may be done in accordance with both the magnitude and direction of polarity of a unidirectional control potential or error signal applied to the control terminals 23 and 24 of the motor control. A typical example of a motor control of this character is shown in the patent to Michael Bracutt, No. 2,622,239 of December 16, 1952.

In any event, the direction of rotation of motor 14 will be determined by the polarity of a unidirectional control potential applied to the input terminals 23 and 24 of motor control 18. Unless the control potential at terminals 23 and 24 exceeds a predetermined minimum or threshold value or if its value is zero, motor 14 will remain stationary even though energized.

Disposed in proximity to the moving input web portion 1 is an input thickness gauge designated generally as 30 and which comprises a measuring portion 31 and an indicator portion 32. The thickness gauge may preferably be of the X-ray type as shown in my Patent No. 2,549,402 issued on April 17, 1951 or it may be a flying micrometer, such as an "electrolimit" continuous thickness gauge, Model D, manufactured by Pratt & Whitney Company, of Hartford, Connecticut. Any suitable thickness gauge may be used.

The output of the measuring portion 31 of the thickness gauge 30 consists of a deviation or error signal in the form of a unidirectional current which produces a deflection on the indicator 32. Indicator 32 is preferably a suitably calibrated and damped center-zero direct current indicating instrument. Any deviation of the web thickness from an adjustably predetermined nominal value, causes the production of a unidirectional control potential by the measuring portion 31 of the gauge 30, the polarity of this control potential or error signal being determined by the direction of any such deviation and its magnitude being proportional to, or otherwise a continuous and at least partially linear function of, the magnitude of such thickness deviation from the desired preadjusted nominal value.

A similar follow-up thickness gauge 33 comprising a measuring portion 34 and an indicator portion 35 is disposed at the output side of the rolls 2 and 3 and continuously measures the thickness of the output portion 4 of the web as it leaves the mill.

The tension applied to the output portion 4 of the web is controlled by means of an adjustable field rheostat 25 which is shown connected in series with the field winding 9 of motor 8. When the resistance of rheostat 25 is increased, the excitation produced by field winding 9 decreases and the speed of motor armature 6 tends to increase, thereby increasing the tension in the output portion 4 of the web. Conversely the tension is reduced by reducing the resistance of field rheostat 25. The resistance of field rheostat 25 is varied by the armature 26 of a small reversible permanent magnet motor 26 which is connected by suitable mechanical coupling means indicated by the dotted line 27 to vary the position of the movable arm 28 of rheostat 25.

The electrical output of the input thickness gauge 30 is applied via a pair of conductors 36 and 37 to the input of a differentiating or transient responsive amplifier illustratively shown as comprising a series capacitor 38 and a shunt resistor 39 connected in the input circuit of a direct current amplifier 40. The output of the amplifier 40 is applied to a memory storage system 43 shown for purposes of illustration as a magnetic tape recorder comprising a recording head 44, an endless recording tape 45, an erasing or obliterating head 46 and a pickup head 47. The endless tape 45 passes over supporting wheels 48 and 49. A drive wheel 50, in frictional driving engagement with the moving input portion 1 of the web, drives the tape supporting wheel 48 through a mechanical or other suitable driving connection indicated by a dotted line 51, such that the speed of rotation of tape supporting wheel 48 and hence the linear speed of tape 45 will always be directly proportional to the linear speed of the input portion 1 of the moving web. Because the linear speed of the tape 45 of the memory storage system 43 is directly proportional to the linear velocity of the input portion 1 of the web, the higher the linear speed of the input portion 1 of the web, the higher will be the speed of the magnetic tape 45 and the shorter will be the time of travel of every point on the magnetic tape 45 from the recording head 44 to the pick-up head 47. Accordingly, the delay interval introduced by the memory storage system 43 will become shorter as the web speed becomes faster, whereby the delay interval of the memory storage system 43 is inversely proportional to the linear velocity of the input portion 1 of the moving web.

The system is so dimensioned that the time required for a point on the input portion 1 of the moving web to travel from measuring portion 31 of input gauge 30 to the nip of the rolls 2, 3 is substantially the same as the time required for a point on the magnetic recording tape 45 to travel from recording head 44 to pickup head 47, suitable allowance being made for the response time of the web thickness controlling mechanism. This results in a properly timed correction in rolling pressure or web tension or both at the instant when actual correction is required for an abrupt change in input thickness and before the rolled material emerges from the mill, as described in greater detail below.

It will be appreciated that suitable signal modulating apparatus may be included in the input circuit of recording head 44 and corresponding demodulation apparatus included in the output circuit of pickup head 47 in order that the direct current error signal applied to the input circuit of recording head 44 may be faithfully reproduced in the output circuit of pickup head 47. Such apparatus is known in the art, particularly in connection with telemetering systems, and has been omitted from the drawing for simplicity of illustration.

The deviation or steady state error signal from the output thickness gauge 33 is applied over a pair of conductors 54 and 55 to the input of a slow-acting servo amplifier 56 through a stabilizing and lead network designated generally as 57. The delayed deviation or transient error signal from pickup head 47 is passed through a normal fast-acting amplifier 58 and the outputs of the fast-acting and slow-acting amplifiers 58 and 56, respectively, are connected cumulatively, additively and conjointly through a pair of conductors 59 and 60 to the control terminals 23 and 24 of motor controller 18. Conductors 59 and 60 also extend to the input of a web tension control amplifier 61, the rheostat control armature 26 being connected to the output of tension control amplifier 61 for response thereto.

A pulsing circuit 62 may be inserted in the leads 59 and 60 to periodically interrupt the circuit for preventing the reversible screwdown motor 14 from operating continuously. Such a pulsing circuit is shown in Patent No. 2,660,077, issued on November 24, 1953, to William R. Macaulay and John E. Coolidge. The pulsing circuit may be of the motor driven type as shown in the Macaulay et al. Patent No. 2,660,077, or it may include one or more vacuum tube trigger circuits having a repetition rate which is timed by one or more adjustable resistor-capacitor circuits for determining the duration of the total cycle and the relative "on" and "off" times of each cycle. Additionally, a signal sensitive circuit may be included in the pulsing circuit which increases the relative "on" time for stronger error signals with respect to the "on" time for weaker signals to obtain a more rapid and forceful corrective action for the larger error or deviation signals which require a larger amount of operation of the screwdown motor 14 for their correction. A pulsing circuit 63 similar to the pulsing circuit 62 may likewise be included in the input to the tension control amplifier 61, if desired, the pulsing circuit 63 having characteristics appropriate to the response characteristics of the tension control portion of the system.

Additional stabilizing devices may be desired, for example tachometer generators or counter pick-offs from shafts of motors 14 and armature 26 with a feedback to amplifiers 56 and 58, in a manner which is well known in the field of servo mechanisms.

The motor control 18 may comprise motor control contactors with suitable polarized relays or rectifier circuits to properly energize the desired contactor to be closed in accordance with the polarity of the over-all deviation signal applied to the input terminals 23 and 24. Additionally, it may be desired that the polarized devices should inherently have an operational threshold such that no motor operation will take place unless the magnitude of the deviation signal exceeds a certain predetermined minimum value. For some applications it may be preferable to exclude the anticipatory deviation signal from the fast-acting transient amplifier 58, except when the output deviation signal from the slow-acting steady state amplifier 56 is of relatively small magnitude.

In operation, when the thicknesses of the input web or strip portion 1 and the output web portion 4 are at their correct desired nominal values, reversible screw-down motor 14 remains idle and slow variations in output thickness are corrected by the slow-acting steady state error signal from the follow-up output gauge 33 so that the mill output is held within proper thickness limits. In the event of a sudden change in input thickness, the input gauge 30 sends a fast-acting anticipatory corrective signal to the motor control 18 and tension control amplifier 61 in timed relationship to the web speed so that the necessary transient correction is made just as the web portion of abruptly changed thickness reaches the nip of the rolls 2 and 3. Accordingly, the web output portion 4 remains substantially unaffected by the abrupt change in input thickness and output gauge 33 produces no slow-acting error signal. If the abrupt change in input thickness is in the nature of an irregularity of short length, then all of the corrective action will be handled principally by the transient responsive input gauge 30.

The anticipatory corrective signal will be of a transient rather than a continuous nature, because continuous supervision of the mill output thickness is assigned on a slow-acting basis to the output gauge 33.

Motor controller 18 may be more effectively of the saturable reactor type as noted above, or thyratron regulators may be used to provide continuous and stepless control. For practical reasons it may be desirable to establish a neutral or dead zone, such that the deviation or error signal must exceed a predetermined minimum threshold value before any corrections are applied.

As shown, the corrective action to vary the amount of thickness reduction is obtained both by tension variation applied through the reel 5 and by screw-down control acting on the rolls 2, 3. By suitable gain adjustments of the tension control amplifier 63 and by corresponding adjustments of the input signal sensitivity of the motor controller 18 for the screw-down motor 14, the thickness control may be apportioned between variations in rolling pressure and variations in tension in any manner desired.

Figure 2:
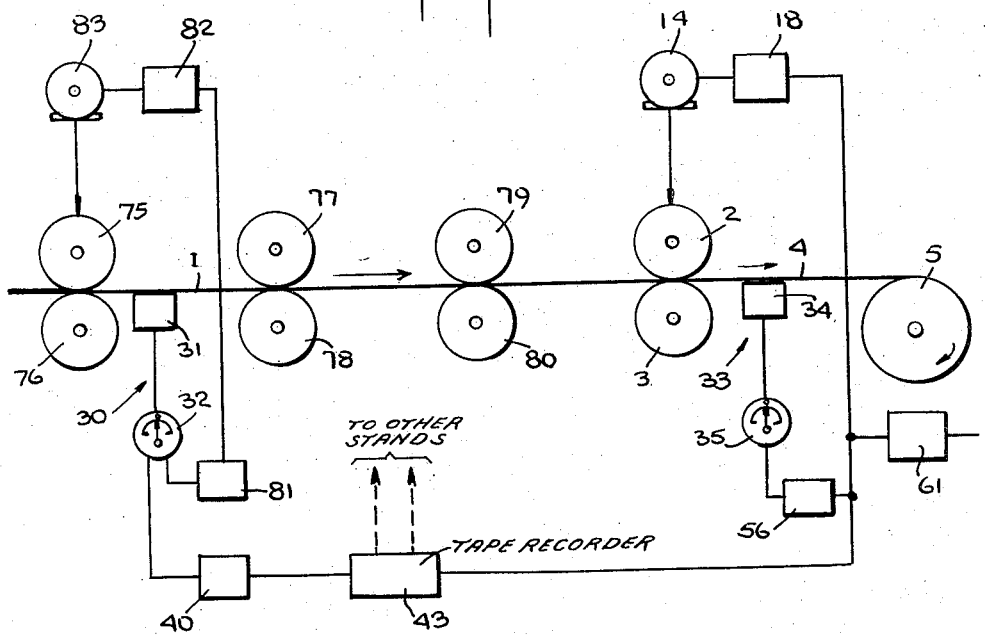
Figure 2 illustrates the application of the invention to a multi-stand rolling mill.

Figure 2 exemplifies the application of the invention to a multi-stand mill, shown with four stands for illustration. The output rolls 2 and 3 of the final stand are arranged as in Figure 1 with screwdown control and tension regulating mechanism as described above. The input gauge is arranged to measure the web thickness as it passes from between the rolls 75, 76 of the first stand to the rolls 77, 78 of the second stand. All of the pairs of rolls 75—76, 77—78, and 79—80 of the first three stands are provided with the usual screwdown mechanism and drive motor speed control (not shown) which may be manually or otherwise controlled to obtain the proper amount of thickness reduction between the rolls of each stand. Driving motors and individual speed control for each stand are provided in conventional manner, but have been omitted from the drawing for simplicity of illustration.

The input gauge 30 and associated apparatus 40 and 43 as previously described actuates the output controller 18 for transients and the like. In addition, the output of gauge 30 is coupled to an amplifier 81 which in turn is connected through a motor controller 82 to actuate the screwdown motor 83 of the first stand in a manner similar to that in which the output gauge 56 controls last stand screwdown motor 14. In this manner, the thickness of web 1 is maintained on-gauge except for transients for which corrective information is still transmitted to output controls via memory storage device 43 as described above. To a large degree, the incoming thickness variations are thus smoothed out by the first pair of rolls 75 and 76.

Alternatively, a multiplicity of pickup heads can be appropriately disposed along the magnetic tape 45 in the memory device 43, each going to a similar amplifier as 58 as in Figure 1 and the corrections applied to the respective screwdown controls of each stand in turn, whereby each stand in succession applies a correction to the off-gauge material, thus distributing the corrective action among the several stands.

It should be noted that the speeds of the several stands must be adjusted to prevent the accumulation of loops between adjacent stands if the material is being rolled without web tension between adjacent stands. If, however, as in the cold rolling of metal strips such as steel, the strip can withstand a relatively large amount of tension, then web tension becomes an important factor in the rolling process which is then somewhat similar to a wire drawing process.

The speed controls for the second, third and fourth pairs of rolls 77—78, 79—80 and 2—3 may then be regulated as for the pulling drum 5 along with the corresponding screwdown controls, by the provision of suitable adjustable field rheostats similar to the field rheostat 25 shown in Figure 1. Additionally, means may be provided for correlating drive motor torque in each of the last three stands and the torque of motor 8 which drives the puller drum 5 in such a manner that the amount of web tension is proportional in each instance to the thickness of the web being pulled in order to maintain uniform tensile stress throughout the web. The web speed will inherently be inversely proportional to its thickness, if correct web tension is to be maintained. This will cause the product of torque and speed to be at least approximately constant at each stand and thereby utilize approximately the same amount of drive motor output power at each stand. This will tend to equalize the distribution of the mechanical burden among the drive motors of the several stands and also among their respective work rolls which receive power from the drive motors.

In a typical tandem mill for the cold rolling of steel, it may be desirable to rely principally on web tension or motor speed control instead of rolling pressure for the regulation of the output thickness. In such a situation, the tension control amplifiers such as amplifier 61 will handle most of the correction, whereas the screwdown motor controls such as motor control 18 will respond only slightly, if at all, to the deviation signal.

I have shown and described what I believe to be the best embodiments of my invention. It will be apparent to those skilled in the art, however, that many changes and modifications may be made in the specific embodiments of the invention which are disclosed herein without departing from the scope of the invention as defined in the appended claims.

What is claimed is:

1. In a rolling mill for effecting a thickness reduction in a moving strip of material passing therethrough, wherein said mill comprises controllable means for adjusting the amount of said thickness reduction, the provision of first and second thickness measuring means disposed to measure the thickness of said strip before and after its passage through said mill respectively, said first measuring means being more sensitive to transient variations in said thickness than to gradual variations therein and said second measuring means being more sensitive to gradual variations in said thickness than to transient variations therein, circuit means including memory storage timing means connecting said first measuring means to said controllable means for adjusting the amount of said thickness reduction in response to a transient variation measured by said first measuring means to maintain constant thickness in the strip emerging from said mill, said memory means deferring adjustment of said controllable means for a time interval inversely proportional to the speed of said strip until that portion of said strip in which a particular transient variation is measured is being reduced in thickness by said mill, and further circuit means connecting said second measuring means to said controllable means for gradual slow-acting adjustment of said thickness reduction to maintain said constant thickness in said emerging strip.

2. In a rolling mill according to claim 1, the provision of memory storage means which comprises a recording medium, means for driving said medium at a speed proportional to the speed of said strip, means connected to said first measuring means for impressing information on said recording medium corresponding to the transient thickness variations measured by said first measuring means, and reproducing means connected to said controllable means, said reproducing means being actuated by said information impressed on said recording medium.

3. In a rolling mill according to claim 2, the provision of memory storage means wherein said recording medium is endless, said memory storage means further comprising obliterating means acting on said recording medium, said obliterating means being disposed intermediate said recording means and said reproducing means to obliterate said information after said reproducing means has been actuated thereby.

4. In a rolling mill for effecting a thickness reduction in a moving strip of material passing through said mill, said mill comprising a plurality of stands acting successively on said strip and each comprising individually controllable adjustment means for varying the amount of thickness reduction produced thereby, the provision of first and second thickness measuring means disposed, respectively, to measure the thickness of said strip as it emerges from the first and last stands of said mill, said first measuring means being sensitive to transient variations in the thickness of said strip, means including memory storage time delay means connecting said first measuring means to the adjustment means for said last stand to vary the thickness reduction produced by said last stand, the time interval of said delay means causing the adjustment of said last stand in response to a transient variation in the thickness of said strip emerging from the first stand to be made when the portion of said strip having a particular transient variation in thickness is passing through said last stand, and means connecting said second measuring means to the adjustment means of the last stand, said last named connecting means and said second measuring means comprising means for controlling said adjustment means of said last stand in response to gradual variations in the thickness of the strip emerging from said last stand.

5. In a rolling mill for effecting a thickness reduction in a moving strip of material passing through said mill, said mill comprising a plurality of stands acting successively on said strip and each comprising individually controllable adjustment means for varying the amount of thickness reduction produced thereby, the provision of first and second thickness measuring means disposed, respectively, to measure the thickness of said strip as it emerges from the first and last stands of said mill, said first measuring means being sensitive to transient variations in the thickness of said strip, means connecting said first measuring means to the adjusting means for the first stand of said mill to maintain substantially constant thickness in said strip as it emerges from said first stand, means including memory storage time delay means connecting said first measuring means to the adjustment means for said last stand to vary the thickness reduction produced by said last stand, the time interval of said delay means causing the adjustment of said last stand in response to a transient variation in the thickness of said strip emerging from the first stand to be made when the portion of said strip having a particular transient variation in thickness is passing through said last stand, and means connecting said second measuring means to the adjustment means of the last stand, said last named connecting means and said second measuring means comprising means for controlling said adjustment means of said last stand in response to gradual variations in the thickness of the strip emerging from said last stand.

6. In a rolling mill according to claim 5 wherein the number of stands is at least three, the provision of connecting means extending from a stand intermediate the first and last stands to said time delay means, said time delay means comprising means for controlling the adjustment means of said intermediate stand to vary the amount of thickness reduction produced thereby in accordance with the thickness measurements of said first measuring means at the time when a particular portion of said strip having a transient variation in the thickness thereof is being reduced in thickness by said intermediate stand.

References Cited in the file of this patent

UNITED STATES PATENTS

| | | |
|---|---|---|
| 2,251,826 | Fogg | Aug. 5, 1941 |
| 2,264,095 | Mohler | Nov. 25, 1941 |
| 2,275,509 | Dahlstrom | Mar. 10, 1942 |
| 2,339,359 | Shayne et al. | Jan. 18, 1944 |
| 2,441,648 | Senard | May 18, 1948 |
| 2,549,402 | Vossberg | Apr. 17, 1951 |
| 2,764,779 | Zona | Oct. 2, 1956 |

FOREIGN PATENTS

| | | |
|---|---|---|
| 627,000 | Great Britain | July 25, 1949 |